United States Patent [19]

Limouzin et al.

[11] Patent Number: 4,948,555
[45] Date of Patent: Aug. 14, 1990

[54] REMOVAL DEVICE FOR CONTROLLING THE FLOW RATE OF COOLANT FLUID IN A FAST-NEUTRON NUCLEAR REACTOR ASSEMBLY AND CORRESPONDING CONTROL PROCESS AND ASSEMBLY

[75] Inventors: Dominique Limouzin, Lyon; Michel Berte, Caluire; Gérald Chiarelli, Jonage, all of France

[73] Assignee: Framatome, Courbevoie, France

[21] Appl. No.: 257,914

[22] Filed: Oct. 14, 1988

[30] Foreign Application Priority Data

Oct. 14, 1987 [FR] France .................. 87 14213

[51] Int. Cl.⁵ .................. G21C 15/00; G21C 19/04; G21C 3/04
[52] U.S. Cl. .................. 376/352; 138/40; 376/260; 376/443; 376/446
[58] Field of Search ........... 376/352, 364, 363, 454, 376/362, 353, 260, 443, 446; 138/40, 42, 44, 89

[56] References Cited

U.S. PATENT DOCUMENTS

| | | | |
|---|---|---|---|
| 1,641,845 | 9/1927 | Heftler | 138/40 |
| 3,134,722 | 5/1964 | Hespel et al. | 376/364 |
| 3,153,280 | 10/1964 | Jones et al. | 376/454 |
| 3,635,793 | 1/1972 | Kolb et al. | 376/364 |
| 3,878,870 | 4/1975 | Atherton et al. | 138/42 |
| 3,971,698 | 7/1976 | Wolff et al. | 376/352 |
| 3,977,439 | 8/1976 | Lambert | 376/352 |
| 4,202,726 | 5/1980 | Duncombe et al. | |
| 4,505,877 | 3/1985 | Rion | 376/352 |
| 4,540,545 | 9/1985 | Kondo | 376/364 |
| 4,664,879 | 5/1987 | Blaushild | 138/42 |
| 4,732,729 | 3/1988 | Amano et al. | 376/352 |

FOREIGN PATENT DOCUMENTS

| | | | |
|---|---|---|---|
| 599587 | 6/1960 | Canada | 376/352 |
| 1061452 | 7/1959 | Fed. Rep. of Germany | 376/364 |
| 3131405 | 2/1983 | Fed. Rep. of Germany. | |
| 3605016 | 8/1987 | Fed. Rep. of Germany | 138/89 |
| 1230011 | 9/1960 | France | 376/352 |
| 1413971 | 9/1965 | France | 376/364 |
| 2138329 | 5/1973 | France. | |
| 2316703 | 1/1977 | France. | |
| 2402923 | 4/1979 | France. | |
| 845469 | 8/1960 | United Kingdom | 376/352 |
| 67483 | 6/1977 | Japan | 376/352 |
| 1036852 | 7/1966 | United Kingdom | 376/364 |

*Primary Examiner*—Harvey E. Behrend
*Attorney, Agent, or Firm*—Pollock, Vande Sande & Priddy

[57] ABSTRACT

The apparatus comprises a body (13) housed in the bore (2, 5) of the assembly head (1) and a flow rate constrictor (12) housed in the sodium passage channel (4) in the assembly head (1). The body (13) comprises axial locking fingers (30) in the assembly head, which can be maneuvered by a slide block (20) actuated by an assembly manipulating device (9). The flow rate of coolant liquid circulating in the assembly may be easily adapted to the operating conditions of the assembly.

7 Claims, 5 Drawing Sheets

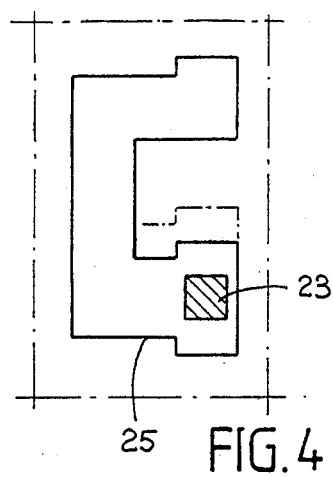
FIG. 4
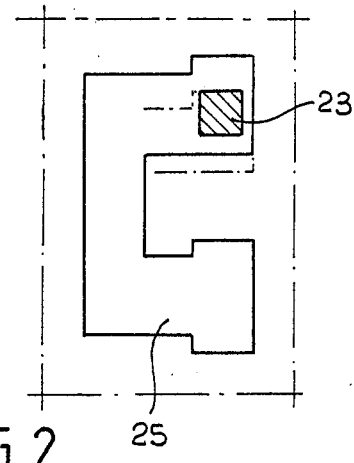
FIG. 2
FIG. 6        FIG. 7
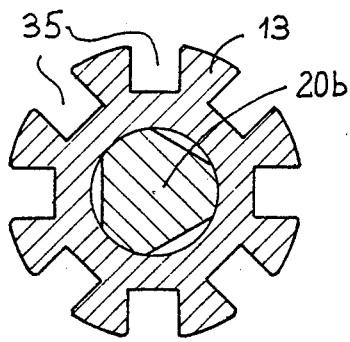
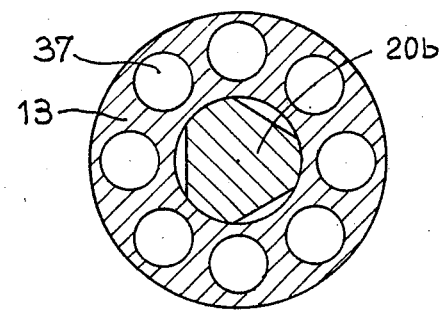
FIG. 5
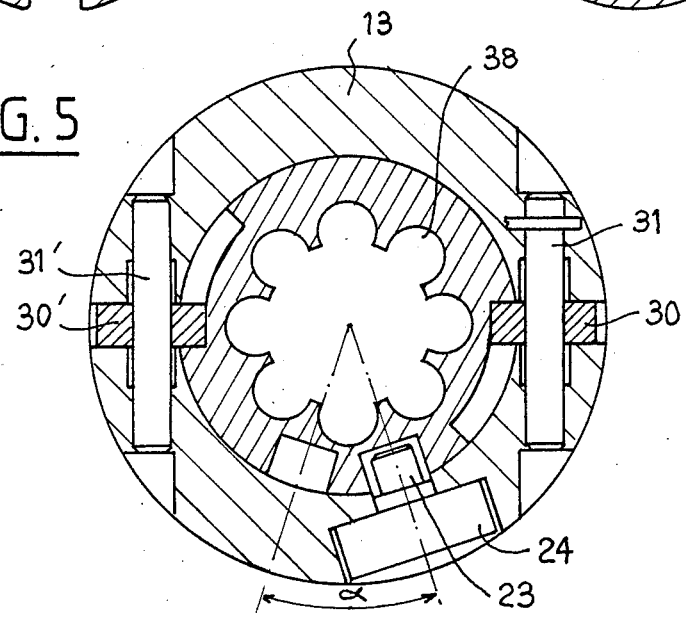

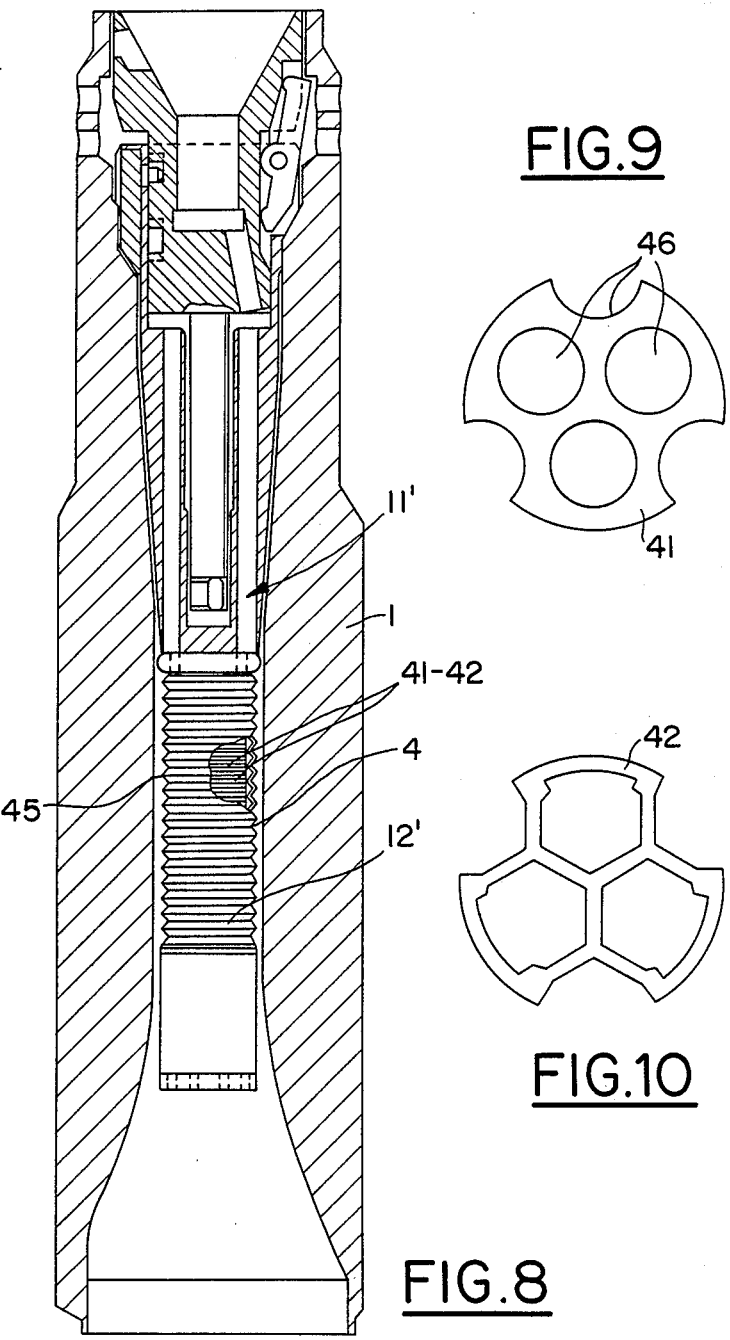

REMOVAL DEVICE FOR CONTROLLING THE FLOW RATE OF COOLANT FLUID IN A FAST-NEUTRON NUCLEAR REACTOR ASSEMBLY AND CORRESPONDING CONTROL PROCESS AND ASSEMBLY

FIELD OF THE INVENTION

The invention relates to a removable device for controlling the flow rate of coolant fluid travelling in an axial direction of a core assembly of a fast-neutron nuclear reactor, an assembly for controlling the flow rate and a control process allowing the flow rate of coolant fluid to be varied as a function of the conditions of use or of storage of the fuel assembly.

BACKGROUND OF THE INVENTION

Fast-neutron nuclear reactors generally comprise a large vessel filled with a coolant fluid such as liquid sodium, in which the reactor core, consisting of adjoining assemblies, is immersed. The core unit consists of assemblies of different types which may be fuel assemblies, fertile assemblies, absorbent assemblies or neutron protection assemblies made of steel.

When the reactor is operating, the removal of the thermal power released or received by each of these assemblies must be ensured. This thermal power can vary essentially as a function of the type of the assembly, of its position in the core and of its residence time in the reactor during operation.

Cooling of the assemblies is ensured by a circulation, in an axial direction of these assemblies, of the sodium coolant filling the vessel. This sodium circulation generally takes place in the vertical direction and from the bottom upwards, the assemblies comprising a first end or foot which is engaged in a stationary structure of the reactor, called a core grid, which is responsible both for supporting the core and for the distribution of sodium into each of the assemblies placed vertically above the core grid. The core grid rests on a flooring which itself bears on the bottom of the nuclear reactor vessel. The primary pumps of the nuclear reactor are responsible for feeding the core grid with cooled liquid sodium after it has passed through heat exchangers.

Because of the wide disparity existing between the quantities of power to be removed by means of each of the core assemblies, devices for controlling the flow rate of the circulating sodium coolant must be provided and adapted to each of the core assemblies in order to obtain a sodium temperature which is as uniform as possible on leaving the core.

It is known to employ flow rate control devices called depression-generating systems, which are fastened in a channel for the circulation of sodium in an axial direction passing through the foot of the assembly. These depression-generating systems comprise elements restricting the circulation of sodium inside the circulation channel and are fastened irremovably to the foot of the assembly. It is also possible to fasten these depression-generating systems irremovably to the core grid of the reactor, in the housing of the foot of a corresponding assembly.

It has also been proposed to fasten certain depression-generating systems irremovably to the interior of a reactor core grid, in order to modify, if desired, by changing the depression-generating systems, their capacity for controlling the flow rate of sodium in the corresponding assemblies. These operations of changing the depression-generating systems require the use of exceptional means of intervention in the reactor and the use of complex and wholly unconventional procedures.

In the case where the depression-generating system is fastened irremovably to the foot of the assembly, the flow rate passing through the assembly and the average sodium outlet temperature are calculated for a predetermined constant power. When the thermal power of the assembly varies in the reactor during operation, for example as a function of its residence time, when a fertile assembly is involved, or else as a function of the position which it occupies in the core, in the case of a fuel assembly, the constant and predetermined flow rate passing through the assembly, which is adapted either to the initial conditions or to the final conditions in which the assembly operates, necessarily introduces a thermohydraulic penalty, and hence a loss in efficiency, in the course of operation.

In the case where the depression-generating system is fastened irremovably to the core grid of the reactor, there is a risk of blocking of the corresponding channel and hence a risk of a complete loss of cooling of a fuel assembly. In certain cases, a blockage of this kind cannot be detected, with the result that remedial action cannot be taken promptly enough to be effective.

It therefore appears useful to have available a process making it possible to modify the control of flow rate in a fuel or fertile core assembly of a nuclear reactor and capable of being used in a simple manner and without involving exceptional means.

For example, in the case of the transfer of a fuel assembly from the center of the core to the periphery, into the region of the steel reflector assemblies, a 10-fold reduction in the flow rate of coolant fluid must be obtained to avoid any thermohydraulic penalty.

A flow rate reduction of this kind is necessary, in particular, if it is desired to effect the storage of the fuel assemblies inside the reactor vessel.

In the case of a fertile assembly whose power increases with the residence time in the reactor core, a thermohydraulic penalty due to the overcooling of the assembly must be accepted at the beginning of its life.

The core assemblies of a fast-neutron nuclear reactor comprise, at the end opposite from their foot, in the axial direction, an end part called a head, which comprises a central bore in which a housing is provided for hooking on the claws of an assembly manipulating grab. This central bore is extended in the direction of the foot by a coolant fluid passage channel in axial direction, whose diameter is smaller than the diameter of the bore in its upper part allowing the assembly to be grabbed.

The head part of the fuel or fertile assemblies consists of a massive steel component responsible for the upper neutron protection of the assembly.

This head part of the assembly has so far never been employed to receive a device for controlling the flow rate of coolant fluid, such as a depression-generating system.

SUMMARY OF THE INVENTION

The purpose of the invention is to propose a removable device for controlling the flow rate of coolant fluid travelling in an axial direction of a core assembly of a fast-neutron nuclear reactor, comprising an end part, or foot, intended to engage a stationary structure of the reactor responsible for supporting the core and distributing the coolant fluid, and an end part situated opposite in the axial direction, or head, through which the coolant fluid leaves the reactor during operation, the head of the assembly comprising a central bore extended in the direction of the foot by an axially directed passage channel for the coolant fluid, in which at least one housing is provided for hooking on an assembly manipulator, it being possible for this control device to be easily and quickly replaced in any assembly by using the usual means for manipulating the assembly.

For this purpose, the removable control device according to the invention comprises:

a member for restricting flow rate, capable of being housed in the channel of the assembly head comprising means for limiting the free passage of this channel, and a supporting body integrally attached to the restricting member and situated in its axial extension, capable of being housed in the bore of the assembly head, comprising means for axial bearing and for centering the assembly head in the bore and means for locking the assembly head in rotation about the axis, and removable means for axial locking, intended to interact with the housing for the assembly manipulator and members for grabbing to ensure the manipulation of the device by using the assembly manipulator.

The supporting body preferably comprises a central cavity and carries at least two pivoting fingers an actuating part of which is accessible from the central cavity and a hooking part of which is capable of engaging in the housing of the assembly head, and the means for actuating the fingers consists of a slide block mounted in the central cavity of the body and connected to the body with a certain latitude of movement in axial translation and in rotation about the axis of the assembly head, comprising a surface for actuating the pivoting fingers and a cavity for receiving the members for gripping the assembly manipulator.

BRIEF DESCRIPTION OF THE DRAWINGS

In order that the invention may be more clearly understood, a description will now be given, by way of example with reference to the appended drawings of several embodiments of a device for controlling flow rate according to the invention and of a process for controlling flow rate capable of being adapted to the operating conditions of the fuel assembly.

FIG. 2 is a side view along 2 of FIG. 1.

FIG. 4 is a side view along 4 of FIG. 3.

FIG. 5 is a view in section along line 5—5 of FIG. 1A or of FIG. 3.

FIG. 6 is a view along line 6—6 of FIG. 3.

FIG. 7 is a sectional view similar to FIG. 6, showing an alternative embodiment of the coolant fluid passage through the body of the device for controlling flow rate.

FIG. 8 is a view in axial section of a control device according to the invention and according to an alternative embodiment.

FIG. 9 is a plan view of a first unit forming part of the member for restricting flow rate of the device shown in FIG. 8.

FIG. 10 is a plan view of a second unit forming part of the member for restricting flow rate of the device shown in FIG. 8.

DESCRIPTION OF PREFERRED EMBODIMENT

Figure 1A:
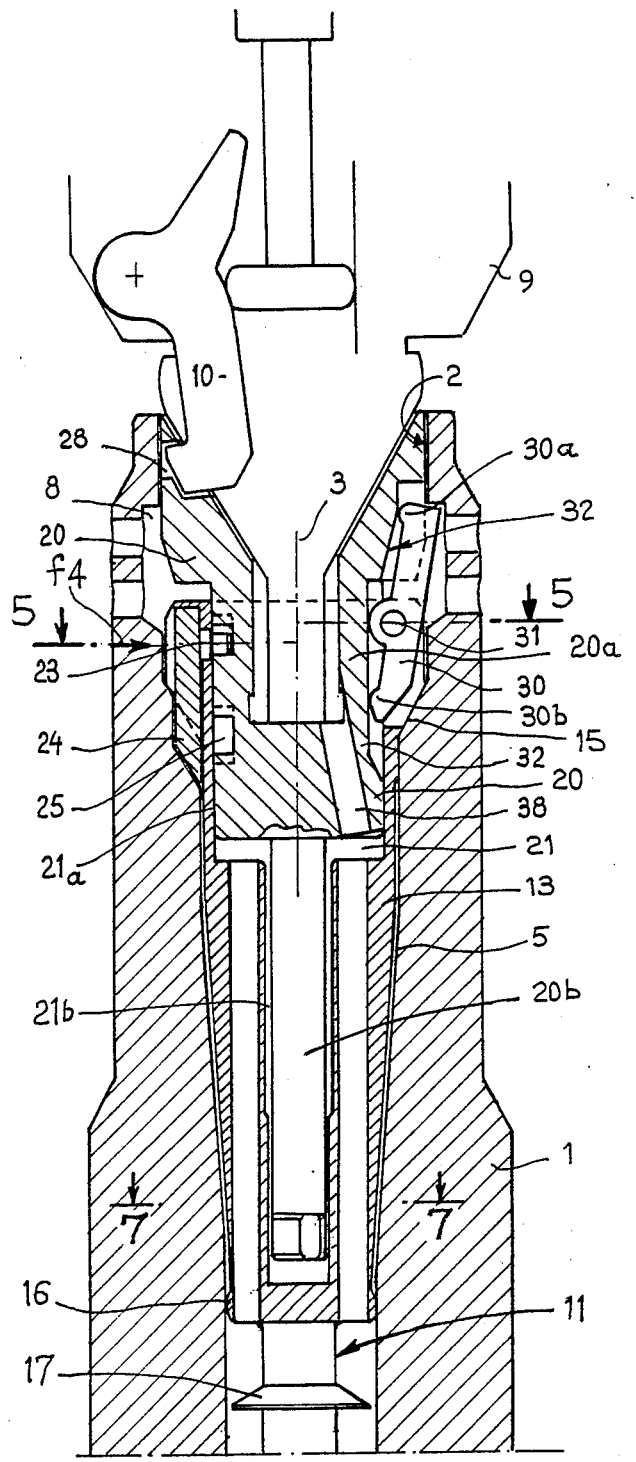
FIGS. 1A and 1B are portions of FIG. 1, showing, in axial section, the upper part and lower parts, respectively, of an assembly head and of a device for controlling flow rate according to the invention in a locked position in this assembly head.
Figure 1B:
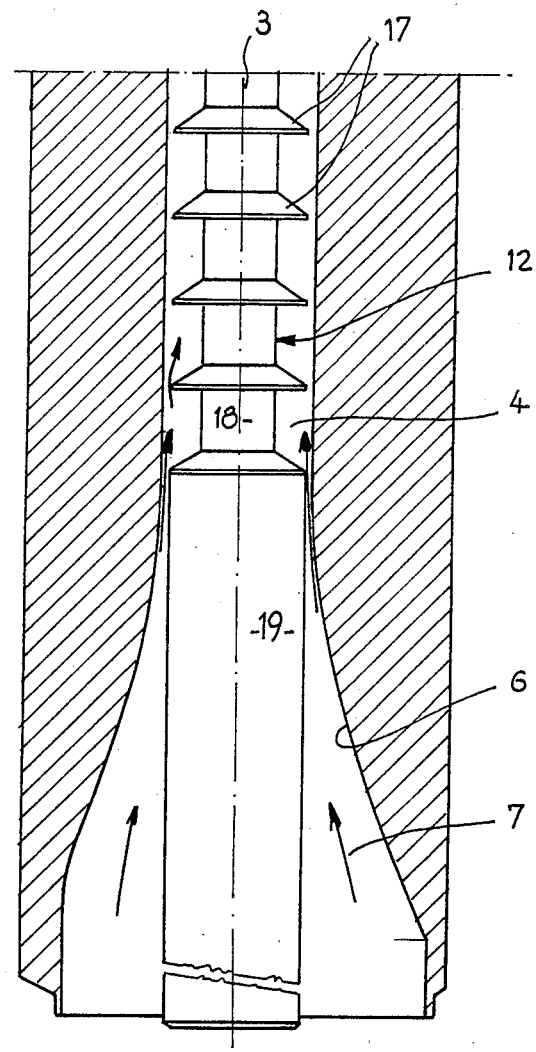
Figure 3:
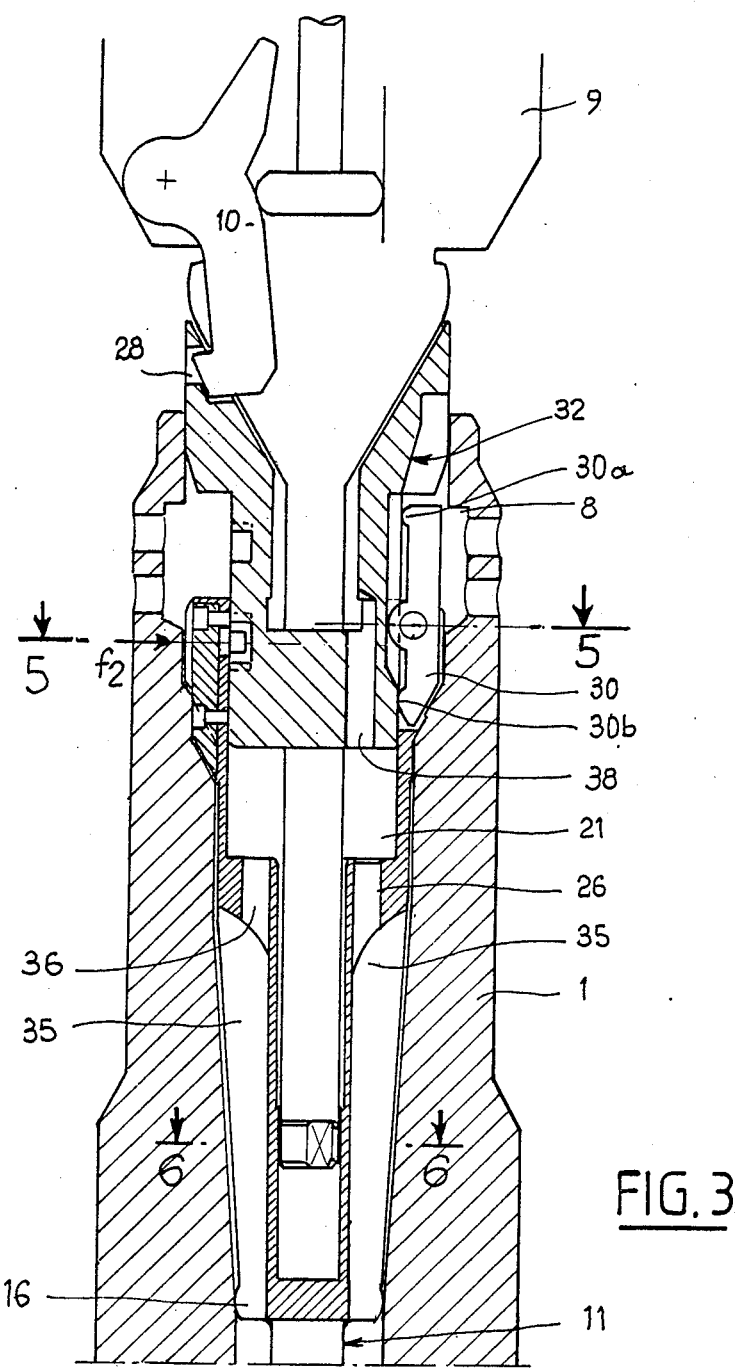
FIG. 3 is a view similar to FIG. 1A of the upper part of an assembly head and of a device for controlling flow rate according to the invention while being withdrawn from the assembly head.

FIGS. 1 and 3 show an assembly head of a fast-neutron nuclear reactor cooled with liquid sodium. This assembly head 1 consists of a massive piece of steel of tubular shape which is responsible for the neutron protection of the upper part of the assembly. This assembly head comprises a central bore 2, symmetrical in revolution about the axis 3 of the assembly. The bore 2 opening out at the upper part of the assembly head is extended downwards, i.e., in the direction of the foot of the assembly by a cylindrical channel 4 whose diameter is smaller than the minimum diameter of the bore 2. The bore 2 is connected to the channel 4 by a frusto-conical surface 5 whose apex angle is substantially equal to 30°. The liquid sodium for cooling the assembly entering in the foot part of the assembly, remote from the head 1 in the axial direction passes through the assembly in the direction of the axis 3, where this sodium cools the fissile or fertile fuel pins, and arrives at the lower part 6 of the assembly head 1. This part 6 forms a progressively narrowing conduit connected at its upper part to the channel 4, of fixed diameter and perfectly determined. The flow of sodium in the lower part of the assembly head has been shown diagrammatically by means of the arrows 7.

The sodium coolant leaves the assembly through the upper end of the bore 2.

The internal surface of the assembly head 1 defining the bore 2 is relatively complex in shape and defines an annular cavity 8 machined by hollowing out the inner wall of the assembly head and intended to receive the hooking ends of the claws 10 of a grab 9 making it possible to ensure the manipulation of the assembly as a whole, when the device for controlling flow rate according to the invention has been withdrawn from the head 1.

FIGS. 1 and 3 show a device for controlling flow rate, indicated as a whole by reference 11, introduced into the assembly head 1.

In FIG. 1, the device 11 is in a locked position inside the bore 2 and the channel 4 in the assembly head 1, whereas in FIG. 3, the device 11 is in an unlocked position and partially withdrawn from the bore 2.

The device 11 comprises a member for restricting flow rate 12 and a body 13 integrally attached to the member 12 and arranged in its axial extension. The body 13 is responsible for bearing and holding the device for controlling flow rate inside the bore 2 of the assembly head 1, by virtue of bearing and centering surfaces interacting with corresponding parts of the bore 2, of its frusto-conical extension 5 and of the channel 4. It should be noted that the parts of the internal surface of the assembly head 1 which is employed for bearing and centring the supporting body 13 of the device consists of members which exist in the assemblies of fast-neutron reactors employed in a conventional manner and that, consequently, these assemblies do not need to be modified to receive the control device according to the invention.

The body 13 for supporting the control device according to the invention has an external surface corresponding substantially to the internal surface of the bore 2 and of its frusto-conical extension 5. The centering of the body 13 in the bore 2 is ensured in the region of a frusto-conical surface 15 for connection between the bore 2 and its extension 5 and in the region of the lower part of the frusto-conical extension 5 on which the body 13 bears by means of a toric surface 16.

The axial bearing of the body 13 in the bore 2 of the assembly head 1 is ensured in the region of the frusto-conical surface 15, by the corresponding surface of the body 13.

The locking of the body 13 in rotation about the axis 3, inside the bore 2, 5, is provided by a stud projecting on the external surface of the body 13 in its part facing the frusto-conical surface 15, this stud engaging in a hollow part of the surface 15 machined by milling. The frusto-conical surface 15 extending the bore 2 comprises, in fact, three millings at 120° whose usual function, in known assemblies, is to provide a passage for sodium in the event of accidental introduction of an assembly foot into the head 1. One of these millings is employed to produce the locking of the body 13 in rotation.

In the embodiment of the device for controlling flow rate shown in FIGS. 1 and 3, the member for restricting flow rate 12 consists of a set of diaphragms 17 of frusto-conical shape and mounted at equal distances from one another on a cylindrical body 18 of axial direction extending the supporting body 13. The diaphragms 17 have a perfectly determined maximum diameter which is slightly smaller than the internal diameter of the sodium circulation channel 4.

In the case of a conventional assembly, where the channel 4 has a diameter of 70 mm, the diaphragms 17 could have a diameter of the order of 64 mm, leaving a radial clearance of 3 mm for the sodium passage. By varying the number of diaphragms of the flow restriction member 12, the sodium flow can be modified and the flow rate of this sodium at the exit of the assembly can be controlled at a desired value.

The vertical shaft 18 on which the diaphragms 17 are mounted is connected, at its lower part, to a massive cylindrical steel component 19 which makes it possible to improve the bearing and the stability of the supporting body 13 in the bore of the assembly head, independently of the locking means which will be described hereinafter. The massive component 19 forms a ballast preventing the lifting movements of the body 13, for example during the manipulation of the locking and unlocking means which will be described hereinafter.

The body 13 comprises a central cavity 21 which has an upper part of large diameter 21a and a lower part of small diameter 21b. This central cavity is intended to receive a part 20 of the control device, which is connected to the body 13 and mounted in the cavity 21 thereof, with a certain latitude to move in translation in the direction of the axis 3 and in rotation about this axis 3.

The part 20 of the body 13, which is referred to by the name of a slide block in the text which follows, comprises an upper part of large diameter 20a engaged in the large-diameter part 21a of the cavity of the body 13 and in the upper part of the bore 2, and a lower part 20b of small diameter, engaged in the small-diameter lower part 21b of the central cavity of the body 13.

Reference will now be made to FIGS. 1 to 4 to describe the method of connection between the slide block 20 and the body 13 of the control device.

In its upper part, the body 13 carries a radially oriented stud 23, by means of a small mounting plate 24. These members can also be seen in FIG. 5. The stud 23 projects inside the cavity 21 of the support 13 in its large-diameter part 21a.

The slide block 20 comprises a C-shaped groove 25, which can be seen in FIGS. 2 and 4, on the side surface of its part 20a. The groove 25 comprises a vertical part connecting two horizontal branches, themselves terminating in end parts in a vertical direction and of different length. The end part of the upper horizontal branch is shorter in length than the end part of the lower horizontal branch.

FIG. 5 shows, furthermore, that the horizontal branches of the C-shaped groove machined in the slide block 20 have a circumferential extension corresponding to an arc $\alpha$, the value of $\alpha$ being 40 degrees in the embodiment shown.

Since the stud 23 and the groove 25 are the only connecting members between the slide block 20 and the body 13, it is quite obvious that the slide block 20 will be capable of moving inside the cavity of the body 13 between its position shown in FIGS. 1 and 2 and its position shown in FIGS. 3 and 4. This movement is obtained by a first rotation of the slide block by an angle $\alpha$ in a first direction, about the axis 3, and then by a vertical movement corresponding to the length of the vertical branch of the C and, lastly, by a movement of the slide block in rotation by an angle $\alpha$ and in the opposite direction to the original direction of rotation.

These movements are made possible by the manipulation grab 9 whose fingers 10 can be introduced into the cavities 28 provided in the upper part of the slide block 20.

As can be seen in FIGS. 1, 3 and 5, the body 13 carries fingers 30, 30' pivotably mounted on the body 13 by means of corresponding horizontal axles 31, 31'.

It should be noted that the axial sections of FIGS. 1 and 3 are broken sections showing both the stud 23 engaged in the groove 25 and the pivoting finger 30, these members being arranged in different axial planes, as can be seen in FIG. 5.

The pivoting fingers 30 and 30' are mounted on the body 13 so as to project inside the cavity 21 of the body 13 by means of two round-shaped actuating surfaces such as 30a and 30b.

Facing each of the sliding fingers 30 and 30', the slide block 20 has an actuating surface 32 whose upper part, which is inclined relative to the vertical direction, can interact with the actuating surface 30a of the corresponding finger 30 to produce the tilting of the upper part of the finger outwards and its introduction into an axial locking position inside the housing 8 machined in the assembly head 1 to allow it to be lifted by the fingers 10 of the grab 9. This tilting of the pivoting finger 30 is produced during a vertical downward movement of the slide block 20 inside the cavity 21 and continues until the time when the lower actuating surface 30b of the pivoting finger comes into contact with the actuating surface 32 of the slide block 20. The stud 23 is then in a high position in the vertical branch of the groove 25 and the motion of locking the body 13 is completed by rotation of the slide block 20 through an angle $\alpha$. The stud 23 is then in its locking position shown in FIG. 2. This position is easily identifiable owing to the fact that it allows the finger a slight clearance inside the groove 25, at the end of the upper horizontal branch of the C-shaped groove 25. In its locked position, the body 3 is held upwards, in the axial direction, with a slight clearance, by the outer hooking part of the finger 3, engaged in the cavity 8 of the assembly head.

To change from the locking position shown in FIG. 1 to an unlocking position, a rotation of the slide block 20, opposite to the previous one and through an angle α, is carried out in succession, followed by a vertical and upward movement of the slide block during which the pivoting fingers 30 and 30' come into contact with a lower part, inclined relative to the vertical, of the actuating surface 32 of the slide block 20, by means of their lower actuating part such as 30b. This actuating surface 30b produces a rotation of the finger whose upper hooking part returns inside the cavity 28 and is then held in this position by the vertical lower part of the actuating surface 32. The unlocking is completed by a rotation of the slide block through an angle α in the direction opposite to the direction of the preceding rotation. The stud 23 then reaches the position shown in FIG. 4. The fact that the stud has been placed correctly in this position can be easily verified, since a clearance in the vertical direction remains between the stud 23 and the part of the groove 25 which is situated at the end of the lower horizontal branch. This clearance can be distinguished from the clearance corresponding to the locking position, because its amplitude is substantially twice as large.

The locking and unlocking positions can therefore be determined unambiguously within the limits of sensitivity of the manipulator 9.

When the slide block is in an unlocking position, as shown in FIG. 3, the fingers 30, 30' are held by the actuating surface 32 in a substantially vertical position where their hooking part is outside the housing 8. The whole of the device for restricting flow rate can then be withdrawn from the assembly head 1 by means of the manipulator 9. The body 13 is, in fact, connected to the slide block 20 whose lifting is performed by means of the groove 25 and of the finger 23.

FIGS. 6 and 7 show two alternative forms of machining of the body 13 which make it possible to ensure the continuity of the sodium passage from the channel 4 to the bore 2, through the body 13.

In the first alternative form shown in FIG. 6, the body 13 comprises eight lateral grooves 35, each of which opens into a channel 36 which can be seen in FIG. 3.

In the alternative form shown in FIG. 7, eight cylindrical channels 37 pass through the body 13.

The channels 36 or 37 open into the central cavity 21 of the body 13, in which the slide block 2 is mounted. Eight cylindrical conduits 38, which can be seen in FIG. 5, pass through the slide block 20 itself. The circulating sodium coming from the inner part of the assembly (arrows 7 in FIG. 1) passes through the body 13 and then through the slide block 20 to emerge again in the upper part of the bore 2, in the widened upper part of the slide block 20.

In its passage through the channel 4, the sodium flow rate is controlled at the desired value by the control member 12 adapted to the type and to the mode of operation of the corresponding assembly.

In the case where the assembly undergoes a change of operating conditions, the corresponding device 11 for controlling flow rate can be easily changed and adapted to the new operating conditions of the assembly.

A change in operating conditions of this kind can arise, for example, in the case of a fuel assembly, from a change in the position of this assembly inside the core.

In order to perform this operation of changing the device for controlling flow rate and for moving the assembly, the manipulator 9, which can consist of the grab for manipulating the assemblies, is introduced in the upper part of the slide block 20 of the device for controlling flow rate of the assembly in question. It should be noted that the slide block 20 comprises an upper cavity 40 whose cylindro-conical shape corresponds to the shape of the part for supporting the manipulator 9, on which the claws 10 are mounted. The claws 10 are engaged into the hooking housing 28 of the slide block 20 and the movements of rotation and of vertical translation which have been described are performed, making it possible to change from the locking position shown in FIG. 1 to the unlocking position of the fingers 30 of the body 13, shown in FIG. 3.

This device 11 can then be withdrawn from the fuel assembly by lifting the manipulator 9. The device for controlling flow rate is deposited in a storage region allocated in the reactor vessel, and the assembly is conveyed as far as its new position in the core by using the manipulator 9 whose fingers 10 then have access to the manipulation housing 8 of the assembly head.

A new device for controlling flow rate, whose restriction member 12 is adapted to the new operating conditions of the assembly, is attached to the fingers 10 of the manipulator 9 by means of the housing 28 of its slide block 20. This control device is conveyed as far as the new position of the assembly, is oriented and is introduced into the central bore and into the channel of the assembly head. To this end, the fingers 30, 30' of the body 13 are in an unlocking position. The locking of the fingers is then performed, as described earlier, by moving the slide block 20 in rotation and in translation. The fuel assembly is then fitted with a device for controlling flow rate which is adapted to its new operating conditions.

An alternative embodiment of a device for controlling flow rate according to the invention is shown in FIGS. 8, 9 and 10, the body and the slide block of this device being identical with those of the devices shown in FIGS. 1 and 3, and the alternative form relating to a different embodiment of the restriction member 12' intended to be housed in the channel 4 of an assembly head 1. This restriction member 12' consists of a stack of diaphragms 41, whose shape can be seen in FIG. 9, and of grids 42, whose shape can be seen in FIG. 10, the grids and the diaphragms being arranged inside a sleeve 45 whose diameter is slightly smaller than the diameter of the channel 14 of the assembly. A fitting clearance must remain between the sleeve 45 and the internal surface of the channel 14, so that a significant flow of sodium can surround the member 12' for restricting flow rate. There is a risk that this bypass flow may interfere with the main flow of sodium passing through the control device 11'. This bypass flow is therefore reduced to a very low value by shaping the sleeve 45 so that it has successive undulations forming, with the internal part of the channel 4, a labyrinth seal in which the bypass flow becomes practically zero; a minimum radial clearance of 1/10 mm is provided between the sleeve and the internal surface of the channel in this embodiment.

The control of flow rate in a device such as shown in FIGS. 8 to 10 can be easily adapted by producing a stack of any desired number of successive diaphragms and grids. Standard diaphragms whose openings 46 have fixed dimensions can thus be employed. Similarly, the grids 42 are standard in shape and dimensions.

In the case of a fuel assembly which in its head part has a sodium passage bore with a diameter of 70 mm, it has been possible to obtain, with a device according to the invention, a sodium outflow rate of 4.8 kg/s at a sodium feed pressure in the core grid of 6 bars, with a pressure drop of 4.6 bars in the assembly.

The device according to the invention and the corresponding process for controlling flow rate make it possible to adapt the flow rate of sodium in an assembly to its operating regime in all cases, because of a design of the control device which renders it removable and perfectly accessible from above the reactor core. The operations which are necessary for changing a control device can be easily performed with a conventional manipulator for fuel assemblies. This device and this control process make it possible, in particular, to perform movements of fuel assemblies from the center towards the periphery of the core or from the core to a storage region in a vessel, without reducing the thermal efficiency of the reactor.

It is also possible to create an internal storage region in the reactor, for example for the core recharge assemblies, and to increase the number of positions intended to receive assemblies affected by cladding ruptures.

With regard to fertile assemblies whose power changes in the course of time, the device and the process according to the invention make it possible to adjust the average sodium outlet temperatures each irradiation cycle to the maximum power obtained at the end of the assembly cycle.

Furthermore, the use of a removable device for controlling flow rate makes it possible to facilitate the operations of the removal of residual sodium and of the washing of an assembly which must be removed from the reactor. It is thus possible to wash an assembly having a higher residual power than is possible with conventional techniques. The assembly manipulation rates and the availability factor of the nuclear reactor are thus increased.

The invention is not limited to the embodiments which have been described.

The means for centering, locking in rotation and bearing the body of the device may be different from those described. Similarly, the locking of the body of the device in an assembly can be produced by means other than the locking fingers maneuvered by a slide block. The maneuvering member for locking or unlocking may equally well consist of a member connected to the body of the device, such as the slide block 20 which has been described only by a tool fastened to the end of the manipulator.

The shape and the structure of the body of the device, which are adapted to the shape of the internal bore of the assembly head, could differ from those described. The sodium passage channels through the body of the device for controlling flow rate could be different in shape from those which have been given in the description.

The member for restricting flow rate could be different in shape from those described.

The invention is applicable to the control of flow rate in any kind of assemblies employed in a fast-neutron nuclear reactor.

We claim:

1. In a fast-neutron nuclear reactor comprising a core consisting of fuel assemblies each having a foot end part adapted to engage a stationary structure of the reactor supporting the core and distributing coolant fluid and a head end part located opposite said foot end part in axial direction and through which the coolant fluid leaves the assembly during operation, a device for adapting a rate of flow of said coolant fluid in an axial direction of a core assembly as a function of conditions of use of said assembly during operation of the reactor, the improvement wherein said device comprises
    (a) an assembly manipulator (9) of a type having controllable gripping means;
    (b) a central bore (2, 5) through the head end part of the assembly, said central bore being extended in the direction of the foot end part by an axially directed passage channel (14) for the coolant fluid, said central bore comprising at least one housing (8) for hooking the gripping members of the assembly manipulator, and at least one hollow part in a wall of the central bore;
    (c) a cylindrical shaft (12) carrying diaphragm means adapted to be housed in the passage channel (14) for limiting the free passage of said channel and restricting the coolant fluid flow rate; and
    (d) a supporting body having an external surface corresponding substantially to an internal surface of the central bore, said supporting body being integrally attached to the cylindrical shaft and being located in an axial extension of the shaft, and comprising at least a protruding part for locking the supporting body in rotation about the axis of the central bore by engaging the at least one hollow part of the wall of the central bore, removable means for axial locking of the supporting body in the housing for hooking the gripping members and means for engaging the gripping means of the assembly manipulator;
    (e) the assembly manipulator, when connected to the supporting body, enabling the means for axial locking of the supporting body to be unlocked and the supporting body to be removed from the assembly, said cylindrical shaft being replaced by a new supporting body integrally attached to a shaft carrying diaphragms adapted to other conditions of use of the assembly.

2. The improvement according to claim 1, wherein the supporting body comprises a central cavity and carries removable means for axial locking of the supporting body, said removable means consisting of at least two fingers pivotally mounted on said body, an actuating part of said remobable means being accessible from the central cavity and a hooking part of said removable means being adapted to engage the housing of the central bore, and wherein the means for actuating the fingers consists of a slide block the shape of which corresponds to the shape of the central cavity mounted in the central cavity of the body and connected to the body while being movable in axial translation and in rotation about the axis of the assembly with respect to the body, comprising a surface for actuating the pivoting fingers and means in the shape of at least one cavity for engaging the gripping means.

3. The improvement according to claim 2, wherein the slide block comprises, in its lateral surface, a C-shaped groove which has a vertical branch and two horizontal branches, a stud integrally attached to the body and oriented radially being engaged in the groove, the stud and the groove forming the only elements connecting the slide block and the body.

4. The improvement according to claim 1, wherein coolant fluid passage channels pass in the axial direction through the body of the control device.

5. The improvement according to claim 1, wherein the body comprises grooves in its lateral surface and coolant fluid passage channels.

6. The improvement according to claim 1, wherein the cylindrical shaft is connected at one of its ends to the body and carries annular diaphragms whose maximum external diameter is smaller than the internal diameter of the channel in which the restricting member is to be housed inside the assembly.

7. The improvement according to claim 6, comprising a steel part fastened to the end of the shaft remote from the end of the shaft connected to the body.

* * * * *